(12) United States Patent
Dejaune et al.

(10) Patent No.: US 9,815,130 B2
(45) Date of Patent: Nov. 14, 2017

(54) CALIBRATION HEAD FOR THE DRILLING OF SHAFTS

(71) Applicant: SNECMA, Paris (FR)

(72) Inventors: Claude Gérard René Dejaune, Boissise la Bertrand (FR); Gérard Lehoux, Nainville les Roches (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/405,727

(22) PCT Filed: Jun. 5, 2013

(86) PCT No.: PCT/FR2013/051276
§ 371 (c)(1),
(2) Date: Dec. 4, 2014

(87) PCT Pub. No.: WO2013/182810
PCT Pub. Date: Dec. 12, 2013

(65) Prior Publication Data
US 2015/0151373 A1 Jun. 4, 2015

(30) Foreign Application Priority Data
Jun. 5, 2012 (FR) ...................................... 12 55195

(51) Int. Cl.
*B23B 29/03* (2006.01)
*B23D 77/04* (2006.01)
*B23D 77/00* (2006.01)

(52) U.S. Cl.
CPC ........... *B23D 77/04* (2013.01); *B23D 77/003* (2013.01); *B23D 77/006* (2013.01); *B23B 29/03* (2013.01);

(Continued)

(58) Field of Classification Search
CPC ............ B23B 2251/56; B23B 2251/58; B23B 2251/202; B23B 2251/50;
(Continued)

(56) References Cited

U.S. PATENT DOCUMENTS 1,414,565 A 5/1922 Gallagher
2,610,529 A * 9/1952 Atkinson ............ B23B 51/0493
408/143

(Continued)

FOREIGN PATENT DOCUMENTS

DE 2556977 A1 * 6/1977 ......... B23B 51/0493
DE 2852298 A1 * 6/1980 ....... B23B 29/03421

(Continued)

OTHER PUBLICATIONS

International Search Report issued in International Patent Application No. PCT/FR2013/051276, dated Aug. 21, 2013.

*Primary Examiner* — Daniel Howell
*Assistant Examiner* — Chwen-Wei Su
(74) *Attorney, Agent, or Firm* — Pillsbury Winthrop Shaw Pittman LLP

(57) ABSTRACT

A cylindrical calibration head for the drilling of a shaft, includes three flutes arranged evenly around the circumference so that they are spaced one from the next by an angle of 120° with respect to a rotation with respect to the axis of the calibration head, the flutes allowing for the removal of chips and the passage of lubricant during drilling, each of the flutes including a machining insert of which the position in the flute can be adjusted using an adjusting cartridge.

20 Claims, 4 Drawing Sheets

(52) U.S. Cl.
CPC ..... *B23B 2251/505* (2013.01); *B23B 2251/56* (2013.01); *B23B 2251/58* (2013.01); *B23D 2277/08* (2013.01); *B23D 2277/44* (2013.01); *B23D 2277/46* (2013.01); *Y10T 408/5583* (2015.01); *Y10T 408/905* (2015.01); *Y10T 408/909* (2015.01)

(58) Field of Classification Search
CPC .............. B23B 2251/505; B23B 29/03; Y10T 408/909; Y10T 408/905
See application file for complete search history.

(56) References Cited

U.S. PATENT DOCUMENTS

| | | | |
|---|---|---|---|
| 3,751,177 | A | 8/1973 | Faber |
| 4,133,399 | A | 1/1979 | Herrmann |
| 5,328,304 | A | 7/1994 | Kress et al. |
| 5,791,838 | A * | 8/1998 | Hamilton ............ B23B 51/0493 408/1 R |
| 6,033,159 | A * | 3/2000 | Kress ................... B23D 77/02 408/199 |
| 6,254,319 | B1 * | 7/2001 | Maier ................... B23C 5/2444 407/45 |
| 2003/0103821 | A1 * | 6/2003 | Kress ................... B23D 77/02 408/144 |
| 2010/0054881 | A1 * | 3/2010 | Thomas ................ B23B 51/02 408/1 BD |

FOREIGN PATENT DOCUMENTS

| | | | |
|---|---|---|---|
| FR | 2 924 631 | A1 | 6/2009 |
| JP | 2007216384 | A * | 8/2007 |
| WO | 98/39127 | A2 | 9/1998 |

\* cited by examiner

CALIBRATION HEAD FOR THE DRILLING OF SHAFTS

CROSS REFERENCE TO RELATED APPLICATIONS

This application is the U.S. National Stage of PCT/FR2013/051276, filed Jun. 5, 2013, which in turn claims priority to French Patent Application No. 1255195, filed Jun. 5, 2012, the entire contents of all applications are incorporated herein by reference in their entireties.

DOMAIN

The domain of the invention relates to calibration heads for the drilling of shafts, particularly turbine shafts. In particular, the domain of the invention deals with the structure of a calibration head adapted to provide better straightness, greater stability and better reaming precision.

STATE OF PRIOR ART

The turbine shaft calibration operation is a special method that requires taking account of very restrictive dimensional constraints such as the surface condition, the straightness of the reaming with low tolerance of the order of a few hundredths of a millimeter to guarantee a constant shaft diameter and particularly the thickness of machined shafts and the variation of the thickness: the delta thickness.

One difficulty is in making a reaming when it is done blind, in other words over a considerable length inside a part.

In general, the calibration operation is done using a drilling machine with a bar fitted with a calibration head at one end. This operation governs the finishing operation that is done using a "bottle" type form with a so-called "recessing" drilling head, this term usually being used to refer to the extension and retraction of tools.

A calibration head forms a particularly sensitive part of a drilling tool and it has to be designed to satisfy severe shaft drilling constraints. In general, a calibration head according to the state of the art is fitted with machining inserts and guide pads arranged around the outside surface of said head. Machining inserts may relate to rough machining inserts and/or finishing inserts.

The distribution of guide pads and machining inserts on the head surface and the positioning precision of their adjustment must be such that straight guidance is possible during drilling so that machining can be guaranteed while minimising surface defects to respect dimensional constraints.

FIG. 1 shows an example tool for drilling a shaft 4. The tool comprises a steering shaft 2 and a calibration head 1 fixed to one of the ends of the steering shaft 2 with a rotation axis 6. The tool is previously inserted into a cavity in the shaft to be drilled for pre-calibration.

The shaft to be drilled is usually pre-drilled during a pre-drilling operation so as to remove a large proportion of the material from the shaft to be drilled so that a first cavity 5 and a second cavity 3 can be drilled in said shaft.

The pre-drilling and pre-calibration operations are used to optimise preparation of the finishing phase using a tool comprising a calibration head.

It is found that guidance using two pads located on the front of the calibration head does not result in head stability thus creating vibrations with the consequence of causing a degradation in the surface condition. Other defects may also appear, due to a non-optimised arrangement of the guide pads. In particular, potential degradation includes scratches, concentricity defects and work-hardened surface defects.

FIG. 2 shows a front view of a calibration head according to the state of the art showing two rough machining inserts 12, 13 and a finishing insert 14 slightly set back from the end of the calibration head 1. The front guide pads 11 and 15 are also shown, and are located in front of the calibration head, in other words in the part of the head that will be inserted first into the internal cavity of the shaft to be drilled.

Two back pads are also shown nearby but they are not referenced.

Nevertheless, at the present time, calibration heads have many disadvantages when they are used to drill shafts over a long distance.

A first problem with existing calibration heads is that they induce a bad distribution of cutting and guidance forces. The number of pads appears to be insufficient, but increasing the number of pads could increase friction.

Consequently, degradation on the calibration head itself can quickly occur, particularly on the front guide pads that can break.

A second problem that is difficult with existing solutions is that it is very difficult to adjust rough machining and finishing inserts and guide pads.

For the rough machining and finishing inserts, scaling can occur around the periphery of the attachment bolt hole. This phenomenon is due to random packing because there is no sufficiently precise adjustment system for this type of drilling.

There is also a third problem that results from the position of the cutting angle of finishing inserts that is generally very small. Vibrations during drilling may be amplified if the adjustment is not adjusted as a function of the adjustment of the rough machining inserts and if the latter adjustment is not sufficiently precise. The repercussion of vibrations on the stability of the tool and the calibration head during drilling can lead to errors and degradation to the inside surface of the shaft.

Consequently, calibration heads according to the state of the art have a number of disadvantages such that shafts cannot be drilled guaranteeing sufficient drilling precision, stability during drilling and straightness of the drilling direction. These disadvantages also apply to the heads themselves that can be degraded.

It is then necessary to limit the repercussions of these constraints by different actions, for example such as replacement of parts or tools that may be very expensive.

Furthermore, the ratio of drilled and rejected shafts is high. One problem lies in the domain of turbines, particularly in the aeronautical sector for which parts are very expensive, large and for which excessive errors cannot be tolerated particularly when machining the parts.

SUMMARY OF THE INVENTION

The invention can solve the above-mentioned disadvantages.

The purpose of the invention is a cylindrical calibration head for drilling a shaft. The calibration head according to the invention comprises three flutes uniformly distributed around the circumference so that they are separated from each other by an angle of 120° in rotation about the axis of the calibration head, the flutes being used for evacuation of chips and passage of the lubrication during drilling, each of the flutes containing a machining insert, the position of which is adjusted in the flute by means of an adjustment cartridge.

Advantageously, the calibration head comprises at least one front guide pad arranged on the outside surface of the head in a zone corresponding to the front end of the head, and at least one back guide pad placed on the outside surface of said head in a second zone defining the back zone of said head, one or each back guide pad being placed behind one or each front guide pad, along the same axis as the front guide pad.

Advantageously, the calibration head comprises three front guide pads located in a zone defining a front end of the calibration head, the three pads being arranged uniformly on the outside surface of the head so that they are separated from each other by an angle of 120° relative to rotation about the axis of the calibration head.

Advantageously, the positions of the front guide pads and the flutes on the outside surface of the calibration head are alternated such that the angle between each front guide pad following a flute along the circumference of the calibration head forms an angle of 60° relative to rotation about the axis of the calibration head.

Advantageously, the calibration head comprises a plurality of back guide pads arranged on the outside surface of said head in a second zone defining the back zone of the head. The plurality of pads may correspond to four back pads. Two back pads are then arranged symmetrically relative to each other about the axis of the head. According to one embodiment, at least one back pad is axially offset from a front pad.

According to another compatible embodiment of this embodiment, each of two other back guide pads is located behind a front pad.

Advantageously, the calibration head comprises a set of guide pads arranged on the outside surface of the head, with a number and thickness so that a minimum lubricant flow can be maintained while minimising friction.

Advantageously, one flute contains a finishing insert and each of two flutes contains a rough machining insert.

According to one embodiment, one of the two back pads that are positioned symmetrically relative to the axis of the head, is placed at 30° from the rough machining insert or a finishing insert.

Advantageously, each flute is tapered at an angle equal to approximately 25° within 10%.

Advantageously, the flutes are sized to allow the injection of a flow of 380 L/min of lubricant within 15% for a pressure of 15 bars within 15% in the calibration head in the shaft to be drilled.

Advantageously, the length of the flutes along the axis of the calibration head is more than 50% of the length of the calibration head.

Advantageously, each machining insert has three edges that can be configured so as to select a working edge by means of the adjustment cartridge.

BRIEF DESCRIPTION OF THE FIGURES

Other characteristics and advantages of the invention will become clear after reading the following detailed description with reference to the appended figures that show.

DESCRIPTION

In the remainder of the description, "drilling straightness" refers to the straight and fixed direction along which a shaft is drilled. The straightness requirement is respected when it is possible to drill straight along a fixed direction, particularly in a shaft.

In the remainder of the description, we will consider that general shape of the calibration head is approximately cylindrical. The average cylinder comprises a central axis that corresponds to the axis 6 of the calibration head.

In the remainder of the description, a "thickness" refers to the difference between the inside diameter and the outside diameter. The "delta thickness" then corresponds to the variation in this thickness.

A calibration head according to the invention discloses an arrangement of machining inserts on the outside surface of the calibration head to prevent any unbalance of the head during drilling.

"Regular arrangement" refers to inserts or flutes, an arrangement of these inserts or flutes so that the geometric centre of gravity of the calibration head is made to coincide, at least approximately, with the centre of gravity of the calibration head. A regular arrangement of the inserts or flutes on the calibration head may be considered either by taking account of the arrangement of the pads, or without taking them into account.

In particular, when the number of pads distributed on the head surface, at a given position of the head axis, is not a multiple of the number of flutes or machining inserts, then the regular arrangement of the flutes or inserts on the head does not take account of the distribution, number and arrangement of the guide pads.

An appropriate distribution of machining inserts can enable straight drilling, the required lubricant flow as far as the end of the head and sufficient evacuation of cut chips of material. Finally, the balancing between appropriate drilling pressure and the necessary lubricant flow is improved.

Figure 3:
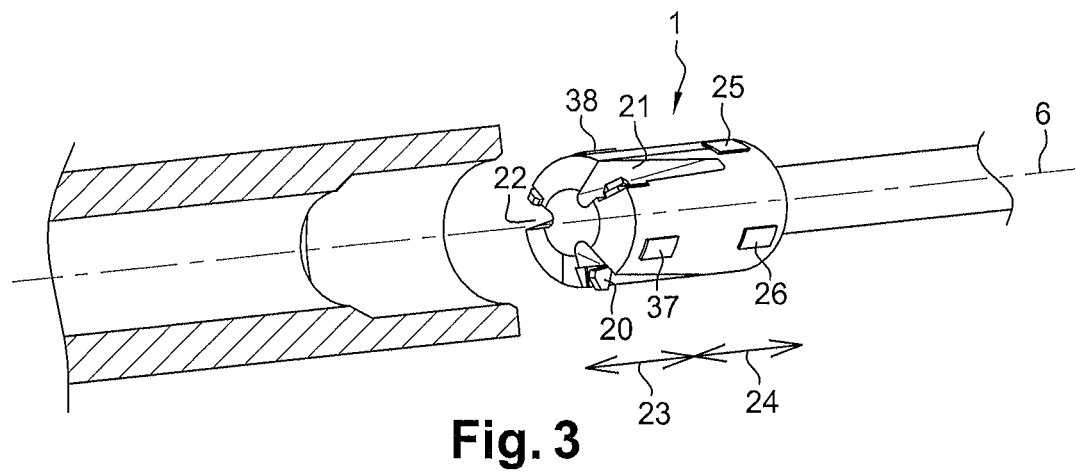
FIG. 3: a drilling tool comprising a calibration head according to the invention.

FIG. 3 shows a calibration head 1 according to the invention. This head comprises three flutes 20, 21, 22 that are also shown in the front view of the head in FIG. 4. The flutes are preferably geometrically approximately identical.

The calibration head according to the invention comprises three flutes machined at the end of the calibration head and extending along the direction of the axis of rotation 6 of the head towards the back of the head. The flutes are machined such that they are distributed at equal distances from each other around the circumference of said head. The three flutes form an equilateral triangle in the plane normal to the axis 6, considering three points each taken at the same position on each flute.

The axial distribution is also symmetric, the three flutes have approximately identical lengths and depths.

Therefore, the weight of the calibration head is distributed symmetrically to define a centre of gravity with circular symmetry properties about the axis 6.

In a configuration of axial symmetry, the flutes are located at 120° from each other, considering the axis 6 of the head as the reference axis of the symmetry.

In this configuration the machining inserts, including the rough machining and finishing inserts, are arranged so that they are held in place in each of the flutes. They are preferably held in place on the same side of each of the flutes with which they are associated. With this configuration, a uniform symmetry of the head can be respected with a good weight distribution. The geometric centre of gravity of the calibration head is approximately coincident with its centre of gravity.

Means of attachment and adjustment are provided so that the inserts can be firmly fixed while enabling a simple disassembly solution to either replace an insert or to modify its orientation so as to replace the cutting edge.

Figure 4:
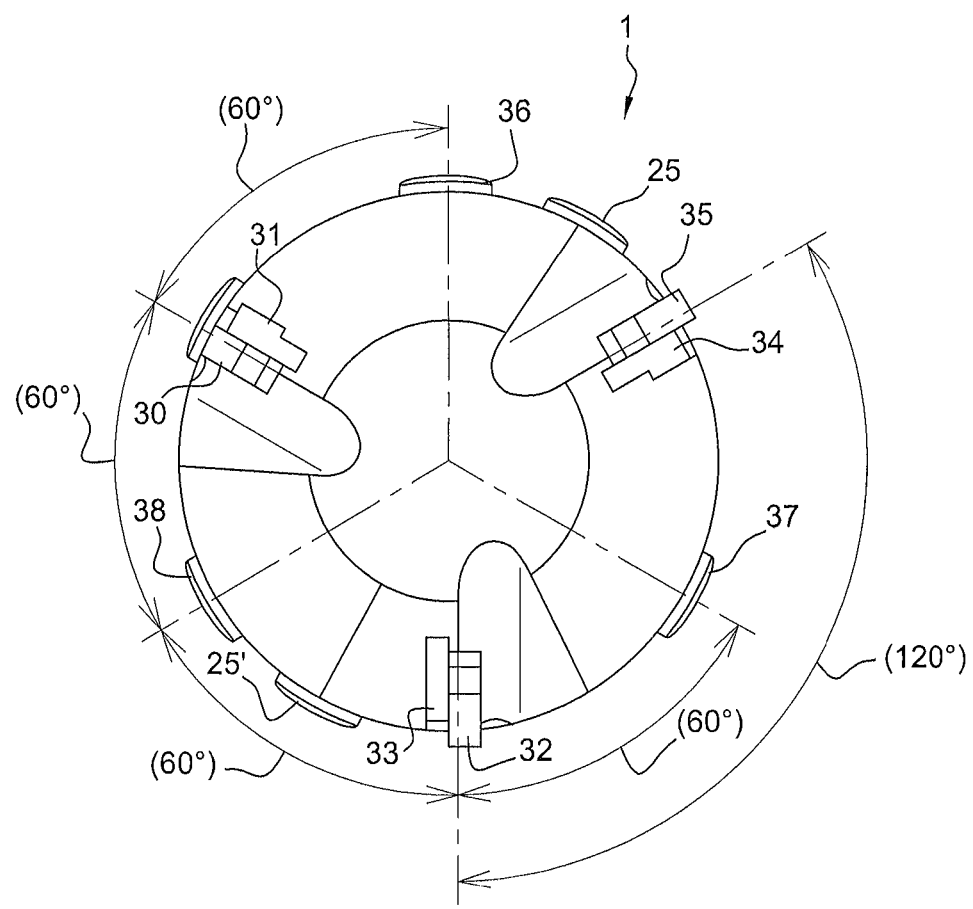
FIG. 4: a front view of a calibration head according to the invention.

In one embodiment, the attachment and adjustment means are adjustment cartridges that enable fine adjustment of the cutting angle of the edge and the height projecting from the flute. Furthermore, the adjustment cartridges can act as a support to hold the machining inserts 30, 32, 35 in position. FIG. 4 shows the adjustment cartridges 31, 33, 34 that hold the inserts in position in the flutes.

According to one configuration of the calibration head to increase the efficiency of cutting the shaft to be drilled, the angle of attack of a rough machining or finishing insert may be high, for example greater than 20° from the axis of a radius of the axis 6 of the head.

The use of adjustment cartridges contributes to maintaining a constant cutting force through the drilling period.

The calibration head according to the invention also includes guide pads. The guide pads on the calibration head include three front pads present on the outside surface of the head in a zone corresponding to the front end of the head.

The pads are present on the outside surface of the head and they are of the order of 1 to 2 mm thick. In one preferred embodiment, the thickness of the pads is 1 mm. This thickness of 1 mm within 30% is particularly advantageous for limiting friction, while enabling a lubricant flow circulating around the outside surface of the calibration head.

According to the invention, the three front guide pads 36, 37, 38 are distributed around the circumference of the outside surface of the head in a balanced distribution. The front guide pads are then arranged at a spacing of an angle of 120° from each other relative to the central axis 6 of the calibration head. They also form an isosceles triangle in a plane normal to the axis 6. Each front guide pad is equidistant from the other front guide pads.

Thus, the three pads balance the weight of the calibration head and the forces applied to it during its rotation.

In one improved embodiment of the invention, the three front pads and the three flutes are distributed alternately and successively around the circumference of the head along a direction of rotation about the axis 6. A flute following a guide pad around the circumference of the calibration head forms an angle equal to approximately 60° with said pad, in rotation about the axis 6 of the head.

Thus, the arrangement of the flutes and the front guide pads at the front end and on the outside surface of the calibration head enables a balanced distribution of the weight of the head preventing the generation of vibrations during drilling.

The position of the two rough machining inserts must be such that cutting forces can be balanced and therefore they are arranged so as to distribute the weight on the head in a balanced manner with the finishing insert and the guide pads. The machining inserts are located at an angular position of 120° from each other because they are held in position in the flutes in the head. They are arranged alternately with the circumferential position of the front guide pads that are themselves at a spacing of 120°.

Considering a reference angle equal to 0° in a cutting plane perpendicular to the axis 6 of the head when the finishing insert is in the low position, the calibration head according to the invention enables alternate distribution of a front guide pad and a rough machining insert every 60°. This arrangement enables perfect distribution of the three pads and the three machining inserts.

In one embodiment, each machining insert located in the inner plane in a flute is held in its plane by an adjustment cartridge fitted with attachment means. The working edges of each of the two rough machining inserts are located at equal distance from the end of the head along the axis 6 of the head. On the other hand, the working edge of the finishing insert is slightly set back by a distance equal to a few millimeters from the working edges of the rough machining inserts. In one preferred embodiment of the invention, the distance between the working edge of the finishing insert and a working edge of a rough machining insert is approximately equal to 8 mm.

The "working edge" is the edge positioned such that it is in contact with material to be removed in the shaft to be drilled.

The position and angle of the machining inserts can be adjusted so as to guarantee:
  straightness better than 0.01 mm variation from a reference axis, and;
  a machined diameter with a variation of not more than 0.02 mm.

These latter two parameters guarantee an approximately constant delta thickness within an acceptable tolerance so that the machined part does not have to be scrapped.

The calibration head comprises flutes with a geometry that increases the stability of the head and improves the ratio of the drilling pressure to the required lubricant flow to be injected at the end of the head during drilling.

In particular, the increased cross-section of the flute can carry a lubricant flow to its front end more easily. The flow is better controlled and can transfer lubricant continuously and regularly throughout the drilling period. A special optimised "funnel" shape gives better cooling, particularly for machining inserts, and prevents jamming by chips during drilling.

Figure 5:
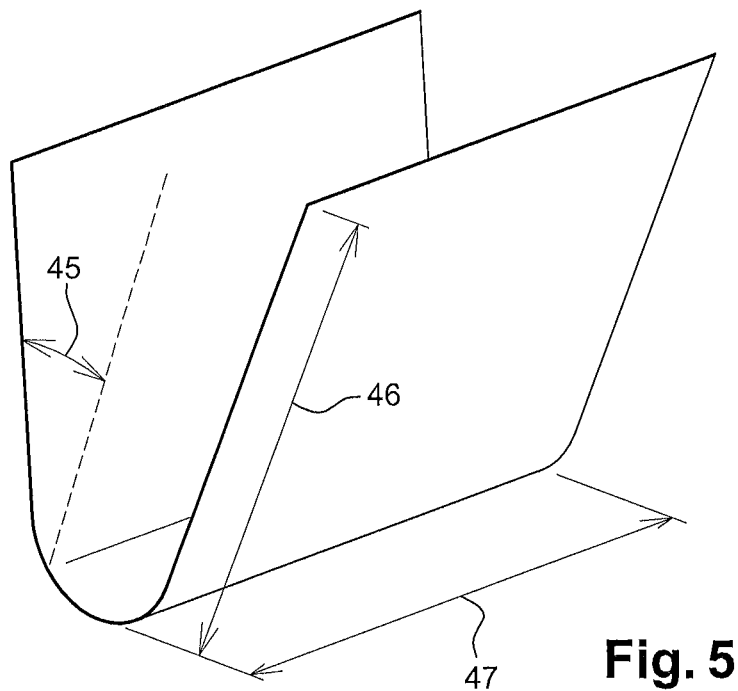
FIG. 5: a perspective of a flute in a calibration head according to the invention.

The width of the flute at the circumference of the calibration head is greater than its depth, the depth of the flute being parallel to the axis 6 of the head and located as close as possible to said head axis 6. FIG. 5 shows a perspective view in which the depth 46 is shown together with the taper corresponding to an angle 45 that facilitates evacuation of chips and the distribution of lubricant.

In one variant embodiment, the depth can vary throughout the length of the flute, for example reducing uniformly. Thus, the depth 46 can be reduced along the length of the flute towards the back of the calibration head 1 particularly to improve the efficiency of lubricant transfer towards the front of the head. The average taper angle 45 is between 10° and 35° depending on example embodiments. According to one example embodiment that can be combined with the latter embodiment, the variation in the depth 46 along the flute can vary from 5 to 30% of the maximum depth.

Thus, chips are transferred towards the back of the calibration head after they have been cut in the shaft. The calibration head thus prevents jamming configurations. The lubricant also flows naturally forwards and it is carried towards the outside edges of the calibration head 1 under the effect of the centrifugal force.

The shapes of the three flutes are identical. FIG. 5 shows a simplified perspective view of a flute of the calibration head according to the invention. Each of the flutes has a length 47 that projects by half 23 of the length of the calibration head 1. On the other hand, they only extend approximately as far as half of the second half 24 of the length of the calibration head. This characteristic contributes to improving the ratio between the pressure applied by the head in to the shaft to be drilled and the lubricant flow that can be carried to the front of the head. The flutes facilitate lubrication so that the life of the tool can be achieved and chips can be evacuated.

The lubricant transfer flow may be more than 350 L per minute and can be continuously of the order of 420 L per minute while maintaining a drilling pressure of the order of 15 bars.

A calibration head according to the invention guarantees a lubricant flow of about 380 L per minute within 20% for a pressure of 15 bars within 20%.

The taper of the flutes around the periphery of the head facilitates adjustment and placement of the three cartridges to support and maintain each machining insert.

The circumferential and axial distribution of the three machining inserts and the three guide pads can increase machining stability over the length of the head. This eliminates and/or reduces vibrations.

Figure 1:
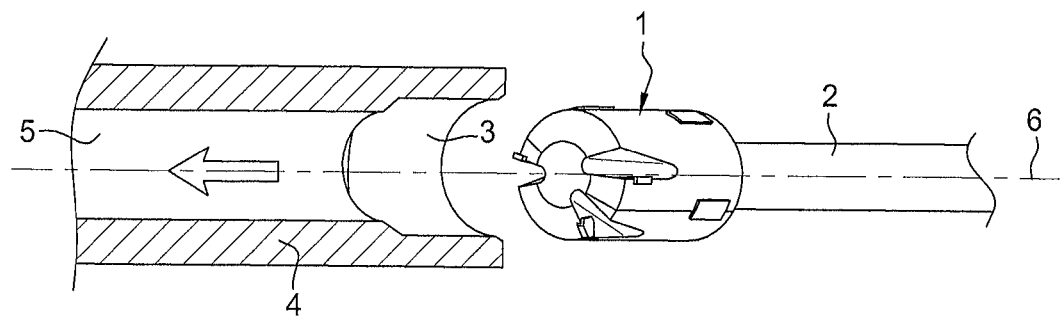
FIG. 1: a drilling tool comprising a calibration head according to prior art.
Figure 2:
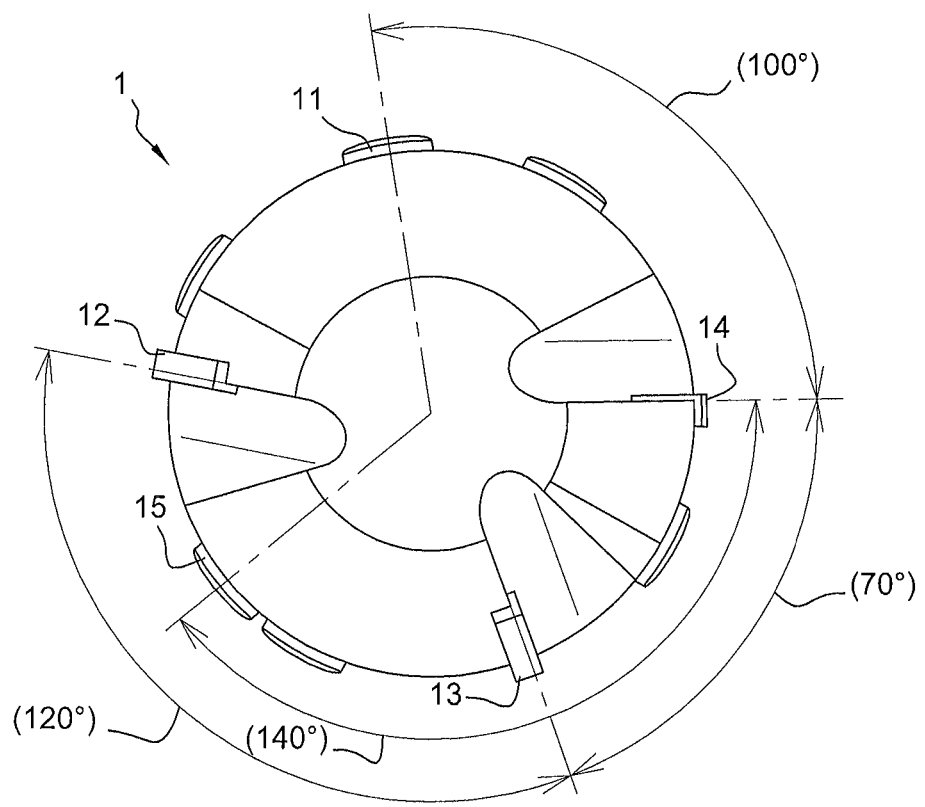
FIG. 2: a front view of a calibration head including machining inserts and guide pads.

In one embodiment, the finishing insert comprises an appendage that is used to position it in the low position in the pre-calibrated cavity of the shaft, see portion 3 in FIG. 1. Advantageously, the finishing insert is preferably arranged to enable symmetric insertion of the calibration head, making use of a fool proofing system positioned in the shaft pre-calibration cavity 3. This initial configuration improves placement of the tool to improve straightness and reduce vibrations during drilling.

The calibration head according to the invention also comprises back guide pads references 25, 26, 25' for the pads visible in FIG. 3 and in FIG. 4, placed at the back of said head. The function of the back guide pads is to maintain guidance during drilling. They can improve the straightness of drilling. They can also absorb some of the vibrations and keep the front end of the calibration head in line. Finally, the front guide pads and the back guide pads reduce friction and improve the drilling pressure.

According to one embodiment, the calibration head according to the invention comprises four guide pads arranged at the back of the head as shown in FIG. 3.

One advantageous distribution is as follows:
first and second back guide pads are arranged along the same axis as a front guide pad, and an angle of 120° separates the first and second back guide pad axes; preferably, the two front guide pads and the two back guide pads are on each side of the flute inside which the finishing insert is held;
the two other back guide pads are arranged symmetrically around the circumference of the calibration head and at the same length along the axis of said head.

The calibration head according to the invention is capable of maintaining a good surface condition. Furthermore the cutting speed is better, and speeds of the order of 0.25 mm per turn are possible. A non-negligible time saving is possible when machining a shaft to be drilled.

A calibration head is particularly efficient for drilling large dimension shafts, for example with a large diameter of the order of 60 to 120 mm.

Figure 6:
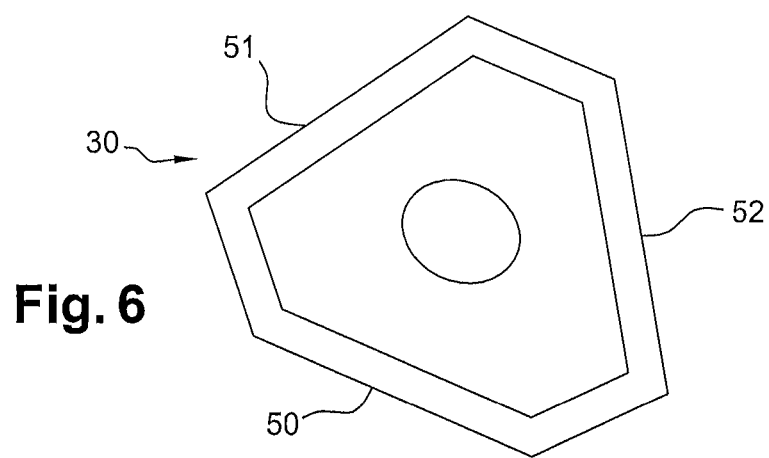
FIG. 6: a rough machining insert of a calibration head according to the invention.

The invention also applies to rough machining and finishing inserts that can be fixed to the calibration head. FIG. 6 shows an example profile 30 of the rough machining insert. This rough machining insert may be the same material grade as the finishing insert, in other words it may have the same metallurgical composition, all that is modified is the profile of the inserts that is not the same for the finishing inserts and the rough machining inserts. One particularly advantageous profile is a profile with three cutting edges 50, 51, 52 that can be used to machine several parts without replacing the insert. All that is necessary when an edge is worn or damaged is to turn the machining insert over and to put it back into the adjustment cartridge.

Figure 7:
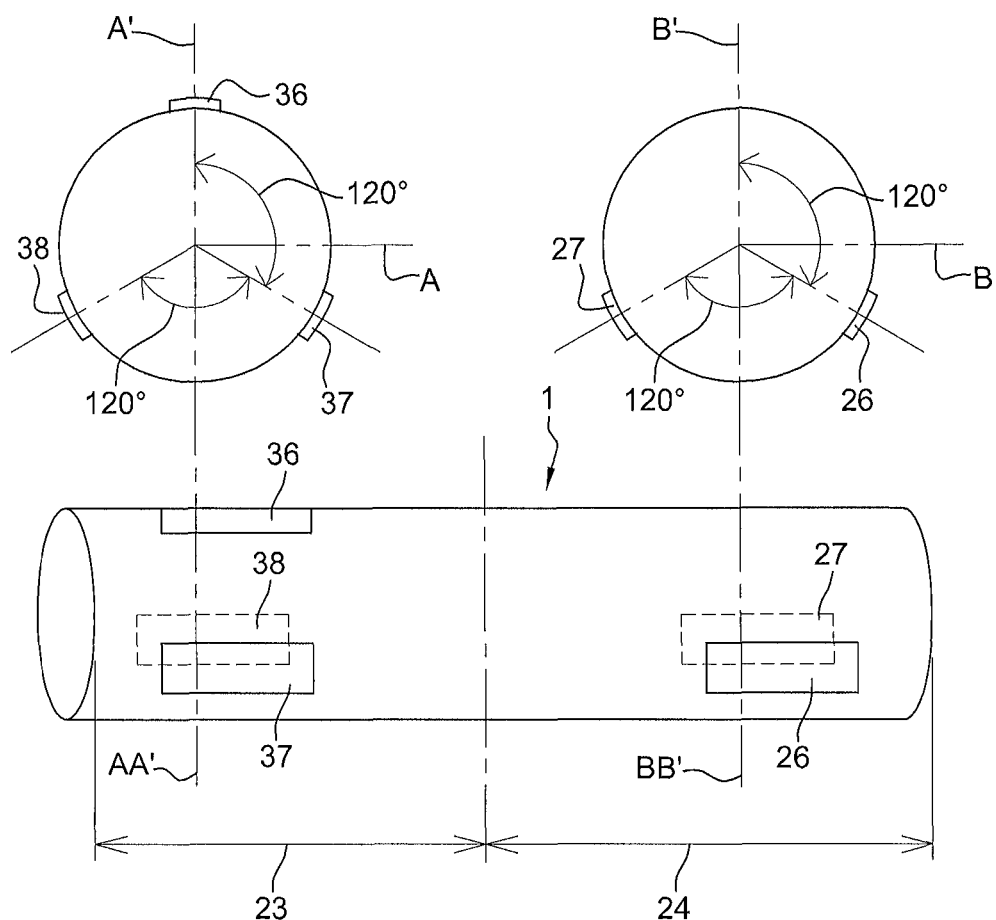
FIG. 7: sectional views of the front and back zone of a calibration head according to the invention.

FIG. 7 shows one embodiment representing back guide pads positioned behind the front guide pads with the same alignment along the axial direction 6 of the head 1. This figure clarifies the embodiment described above with reference to FIG. 3.

A simplified view of the calibration head 1 is shown with no flutes and without the machining inserts. Two sections are shown, with a first section AA' in the zone 23 defining a front end of the calibration head 1 and a second section BB' in the zone 24 defining a back end of the calibration head 1. The zones are shown as in FIG. 3 such that they cover approximately half of the length of the calibration head 1.

In section AA' located in zone 23, the front pads 37 and 38 are circumferentially spaced by an angle approximately equal to 120°. In section BB' located in zone 24, the back pads 26 and 27 are also circumferentially spaced by an angle equal to approximately 120°. The front pad 37 and the back pad 26 are aligned with each other, with one behind the other. Note that the alignment of the pads is parallel to the axis 6 of the head 1. Similarly, the front pad 38 and the back pad 27 are aligned with each other, with one behind the other and are arranged on the surface of the head 1.

This arrangement is identical to the arrangement in FIG. 3, however in FIG. 3, this alignment cannot be shown for pads 38 and 27.

One technical effect of this configuration is that the guidance of the calibration head can be improved throughout its length when drilling, particularly during insertion of the head into the zone to be drilled.

One advantage compared with the configuration in which a single pad extends over the entire length of the head is that there is a saving of mass and precision is better in the head fabrication method.

In the embodiment shown in FIG. 3 and FIG. 7, the two front pads are circumferentially spaced by an angle of 120° which enables precise positioning of the head in the zone to be drilled.

In one variant embodiment, there is only one front pad, for example pad 37, placed on the surface of the head in the zone 23. This pad is then in line with a back pad 26. In this embodiment, a single front pad and a single back pad in line with the front pad can be defined.

This configuration using only two pads in line with each other at the front and at the back may be combined with other front pads (front pads 25 and 25') not necessarily in line with other back pads as shown in FIG. 4.

According to one variant embodiment, the back pad 25' in FIG. 4 is combined with a second back pad 25 arranged symmetrically, in other words diametrically opposite on the back of the calibration head 1. This arrangement enables optimum balancing of the front pads added to this configuration and of the arrangement of the flutes.

The pad 25' is ideally arranged to be angularly close to the rough machining insert 30 or 35 or the finishing insert 32, at approximately 30° in the clockwise direction as shown in FIG. 4. This arrangement holds the head in position, although under its own weight the head would sag when it is stopped and consequently prevents an axial scratch when the head is removed, particularly when the head is stopped.

According to one example, the pad 25' is arranged at an angle of approximately 30° from the finishing insert 32 when rotating in the clockwise direction according to FIG. 4, to prevent lubricant from escaping from flute 20.

The invention claimed is:

1. A cylindrical calibration head for drilling a shaft comprising:
   three flutes extending along an axis of said cylindrical calibration head and uniformly distributed around a circumference of the cylindrical calibration head so that the three flutes are separated from each other by an angle of 120° in rotation about the axis of the cylindrical calibration head, the flutes being arranged for evacuation of chips and passage of a lubrication during drilling, each of the flutes comprising a machining insert, a position of which is adjusted in the flute by an adjustment cartridge;
   at least one front guide pad arranged on an outside surface of the cylindrical calibration head in a first zone corresponding to a front end of the head, and
   at least one back guide pad placed on the outside surface of said cylindrical calibration head in a second zone defining a back zone of said cylindrical calibration head, the at least one back guide pad being aligned with the at least one front guide pad, along a same axis as the at least one front guide pad,
   wherein each of the three flutes extends from a first end of the cylindrical calibration head toward a second end of the cylindrical calibration head along said axis of the cylindrical calibration head and wherein the machining insert of each of the three flutes is positioned, along said axis, closer to said first end of the cylindrical calibration head than the at least one front guide pad.

2. The cylindrical calibration head for drilling a shaft according to claim 1, comprising three front guide pads located in the first zone defining the front end of the cylindrical calibration head, the three front guide pads being arranged uniformly on the outside surface of the cylindrical calibration head so that the three front guide pads are separated from each other by an angle of 120° in rotation about the axis of the cylindrical calibration head.

3. The cylindrical calibration head for drilling a shaft according to claim 2, wherein the positions of the three front guide pads and the three flutes on the outside surface of the calibration head are alternated such that an angle between each front guide pad following a flute along the circumference of the calibration head forms an angle of 60° in rotation about the axis of the cylindrical calibration head.

4. The cylindrical calibration head for drilling a shaft according to claim 1, comprising four back guide pads arranged on the outside surface of said cylindrical calibration head in the second zone defining the back zone of the cylindrical calibration head, two back guide pads being arranged symmetrically relative to each other about the axis of the cylindrical calibration head and each of two other back guide pads being placed behind a front pad.

5. The cylindrical calibration head for drilling a shaft according to claim 1, comprising a set of guide pads arranged on the outside surface of the head, with a number and thickness so that a minimum lubricant flow can be maintained while minimising friction.

6. The cylindrical calibration head for drilling a shaft according to claim 1, wherein one of the three flutes contains a finishing insert and each of the other two of the three flutes contains a rough machining insert.

7. The cylindrical calibration head for drilling a shaft according to claim 6, comprising two back guide pads and wherein one of the two back guide pads that are positioned symmetrically relative to the axis of the cylindrical calibration head, is placed at 30° from the rough machining insert or a finishing insert.

8. The cylindrical calibration head for drilling a shaft according to claim 1, wherein each of the three flutes is tapered at an angle equal to approximately 25° within 10%.

9. The cylindrical calibration head for drilling a shaft according to claim 1, wherein the three flutes are sized to allow the injection of a flow of 380 L/min of lubricant within 15% for a pressure of 15 bars within 15% in the cylindrical calibration head in the shaft to be drilled.

10. The cylindrical calibration head for drilling a shaft according to claim 1, wherein a length of the three flutes along the axis of the cylindrical calibration head is more than 50% of a length of the cylindrical calibration head.

11. The cylindrical calibration head for drilling a shaft according to claim 1, wherein each back guide pad of the at least one back guide pad is placed behind a respective front guide pad of the at least one front guide pad.

12. The cylindrical calibration head for drilling a shaft according to claim 1, wherein said first zone covers half of a length of the cylindrical calibration head, the at least one front guide pad arranged exclusively in said first zone, and wherein said second zone covers a remaining half of the length of the cylindrical calibration head, the at least one back guide pad arranged exclusively in said second zone.

13. A cylindrical calibration head for drilling a shaft comprising:
   three flutes extending along an axis of said cylindrical calibration head and uniformly distributed around a circumference of the cylindrical calibration head so that the three flutes are separated from each other by an angle of 120° in rotation about the axis of the cylindrical calibration head, the flutes being arranged for evacuation of chips and passage of a lubrication during drilling, each of the flutes comprising a machining insert, a position of which is adjusted in the flute by an adjustment cartridge;
   at least one front guide pad arranged on an outside surface of the cylindrical calibration head in a first zone corresponding to a front end of the head, and
   a plurality of back guide pads arranged on the outside surface of said cylindrical calibration head in a second zone defining a back zone of the cylindrical calibration head, two back guide pads being arranged symmetrically relative to each other about the axis of the cylindrical calibration head and of which at least one back pad is axially offset from a front pad,
   wherein at least one of the back guide pads is aligned with the at least one front guide pad, along a same axis as the at least one front guide pad.

14. A cylindrical calibration head for drilling a shaft comprising:
   three flutes extending along an axis of said cylindrical calibration head and uniformly distributed around a circumference of the cylindrical calibration head so that the three flutes are separated from each other by an angle of 120° in rotation about the axis of the cylindrical calibration head, the flutes being arranged for evacuation of chips and passage of a lubrication during drilling, each of the flutes comprising a machining insert, a position of which is adjusted in the flute by an adjustment cartridge;

at least one front guide pad arranged on an outside surface of the cylindrical calibration head in a first zone corresponding to a front end of the head, and at least one back guide pad placed on the outside surface of said cylindrical calibration head in a second zone defining a back zone of said cylindrical calibration head, the at least one back guide pad being aligned with the at least one front guide pad, along a same axis as the at least one front guide pad, wherein each machining insert has three edges that are configured so as to select a working edge by the adjustment cartridge.

15. A cylindrical calibration head for drilling a shaft comprising:

three flutes extending along an axis of said cylindrical calibration head and uniformly distributed around a circumference of the cylindrical calibration head so that the three flutes are separated from each other by an angle of 120° in rotation about the axis of the cylindrical calibration head, the flutes being arranged for evacuation of chips and passage of a lubrication during drilling, each of the flutes comprising a machining insert, a position of which is adjusted in the flute by an adjustment cartridge;

at least one front guide pad arranged on an outside surface of the cylindrical calibration head in a first zone corresponding to a front end of the head, said first zone covering half of a length of the cylindrical calibration head, the at least one front guide pad arranged exclusively in said first zone, and at least one back guide pad placed on the outside surface of said cylindrical calibration head in a second zone defining a back zone of said cylindrical calibration head, said second zone covering a remaining half of the length of the cylindrical calibration head, the at least one back guide pad arranged exclusively in said second zone, the at least one back guide pad being placed behind and in alignment with the at least one front guide pad, along a same axis as the at least one front guide pad, wherein each of the three flutes extends from a first end of the cylindrical calibration head toward a second end of the cylindrical calibration head along said axis of the cylindrical calibration head and wherein the machining insert of each of the three flutes is positioned, along said axis, closer to said first end of the cylindrical calibration head than the at least one front guide pad.

16. The cylindrical calibration head for drilling a shaft according to claim 15, comprising three front guide pads located in the first zone defining the front end of the cylindrical calibration head, the three front guide pads being arranged uniformly on the outside surface of the cylindrical calibration head so that the three front guide pads are separated from each other by an angle of 120° in rotation about the axis of the cylindrical calibration head.

17. The cylindrical calibration head for drilling a shaft according to claim 16, wherein the positions of the three front guide pads and the three flutes on the outside surface of the calibration head are alternated such that an angle between each front guide pad following a flute along the circumference of the calibration head forms an angle of 60° in rotation about the axis of the cylindrical calibration head.

18. The cylindrical calibration head for drilling a shaft according to claim 15, comprising four back guide pads arranged on the outside surface of said cylindrical calibration head in the second zone defining the back zone of the cylindrical calibration head, two back guide pads being arranged symmetrically relative to each other about the axis of the cylindrical calibration head and each of two other back guide pads being placed behind a front pad.

19. The cylindrical calibration head for drilling a shaft according to claim 15, wherein one of the three flutes contains a finishing insert and each of the other two of the three flutes contains a rough machining insert.

20. A cylindrical calibration head for drilling a shaft comprising:

three flutes extending along an axis of said cylindrical calibration head and uniformly distributed around a circumference of the cylindrical calibration head so that the three flutes are separated from each other by an angle of 120° in rotation about the axis of the cylindrical calibration head, the flutes being arranged for evacuation of chips and passage of a lubrication during drilling, each of the flutes comprising a machining insert, a position of which is adjusted in the flute by an adjustment cartridge;

at least one front guide pad arranged on an outside surface of the cylindrical calibration head in a first zone corresponding to a front end of the head, said first zone covering half of a length of the cylindrical calibration head, the at least one front guide pad arranged exclusively in said first zone, and a plurality of back guide pads arranged on the outside surface of said cylindrical calibration head in a second zone defining a back zone of the cylindrical calibration head, two back guide pads being arranged symmetrically relative to each other about the axis of the cylindrical calibration head and of which at least one back pad is axially offset from a front pad, wherein the second zone covers a remaining half of the length of the cylindrical calibration head, wherein at least one of the back guide pads is arranged exclusively in said second zone, and wherein the at least one of the back guide pads is placed behind and in alignment with the at least one front guide pad, along a same axis as the at least one front guide pad.

* * * * *